INVENTORS
JOSEPH R. PROVOST—EDMUND C. GIFFORD—JOHN LAZO
BY
ATTORNEY

July 27, 1965   J. R. PROVOST ETAL   3,196,551
INTEGRATED ANTHROPOMETRIC DEVICE
Filed May 8, 1963   5 Sheets-Sheet 4

INVENTOR.
JOSEPH R. PROVOST - EDMUND C. GIFFORD - JOHN LAZO
BY
Arthur L. Rollins
ATTORNEY July 27, 1965   J. R. PROVOST ETAL   3,196,551
INTEGRATED ANTHROPOMETRIC DEVICE
Filed May 8, 1963   5 Sheets-Sheet 5

INVENTOR.
JOSEPH R. PROVOST - EDMUND C. GIFFORD - JOHN LAZO
BY

*Arthur L. Collins*
ATTORNEY

United States Patent Office 3,196,551
Patented July 27, 1965

3,196,551
INTEGRATED ANTHROPOMETRIC DEVICE
Joseph R. Provost, Levittown, and Edmund C. Gifford, Philadelphia, Pa., and John Lazo, Audubon, N.J., assignors to the United States of America as represented by the Secretary of the Navy
Filed May 8, 1963, Ser. No. 279,663
3 Claims. (Cl. 33—174)
(Granted under Title 35, U.S. Code (1952), sec. 266)

The invention described herein may be manufactured and used by or for the Government of the United States of America for governmental purposes without the payment of any royalties therein or therefor.

This invention relates to improvements in the apparatus for the measurement and delineation of naturally developed characteristics and formations of the human body, and more specifically it is designed to obtain six morpohological measurements comprising the sitting height, the shoulder breadth, the sitting shoulder height, the buttock-knee length, the buttock-leg length and the standing height of air crew personnel.

With the advent of space travel, it becomes increasingly important to obtain reliable measurements of human morphological features in order to properly design both the workspaces and also the control-display configurations in high performance space vehicles. Reliable anthropometric data provides the most efficient means available for solving these design configurations along with a wide variety of problems relating to the sizing of flight clothing, workspaces within the cabin, passageways and escape hatches. Because of the limited space areas that are available inside of a space vehicle, severe penalties can result from poor dimensional design.

Heretofore, it was the practice to obtain these various morphological measurements by use of instruments such as anthropometric calipers of various sizes, tape measures and other such devices. The disadvantage with these measuring instruments was that the data obtained in their use was only as accurate and reliable as the individual who was making the measurements. These instruments were cumbersome to use because they were required to be maintained in the correct position while being read. Therefore, unless the experimenter exercised care, the scales on these instruments could be easily misread since he was required to keep the instrument in the correct position while also taking a scale reading. Another disadvantage with these instruments was that the experimenter had to have a thorough knowledge of the various body points where the measurements were to be taken. A false reading could be obtained by the failure of the experimenter to properly position the instrument upon that part of the body being measured.

One object of this invention is to provide an improved measuring device by which the necessary data for a minimum of six major body dimensions may be rapidly and accurately determined.

Another object of this invention is to provide a device of the class described by means of which the data for obtaining a minimum of six major body dimensions comprising the sitting height, the shoulder breadth, the sitting shoulder height, the buttock-knee length, buttock-leg length and stature may be determined rapidly and accurately by inexperienced experimenters.

Yet another object of this invention is to provide a device of the class described which is integrated to measure several morphological features simultaneously.

With these and many other objects in view, which will more readily appear as the nature of the invention is better understood, the same consists in the novel construction, combination, and arrangement of parts, which will be hereinafter more fully described, illustrated, and claimed.

The essential features of the invention which are involved in means for measuring a selected part of the anatomy, are necessarily susceptible to a wide range of modification from a structural standpoint, and the specific purpose of the machine, without departing from the scope of the invention, but a preferred embodiment thereof, is shown in the accompanying drawing, in which.

In the drawing similar reference numerals indicate similar parts throughout the several views.

Figure 1:
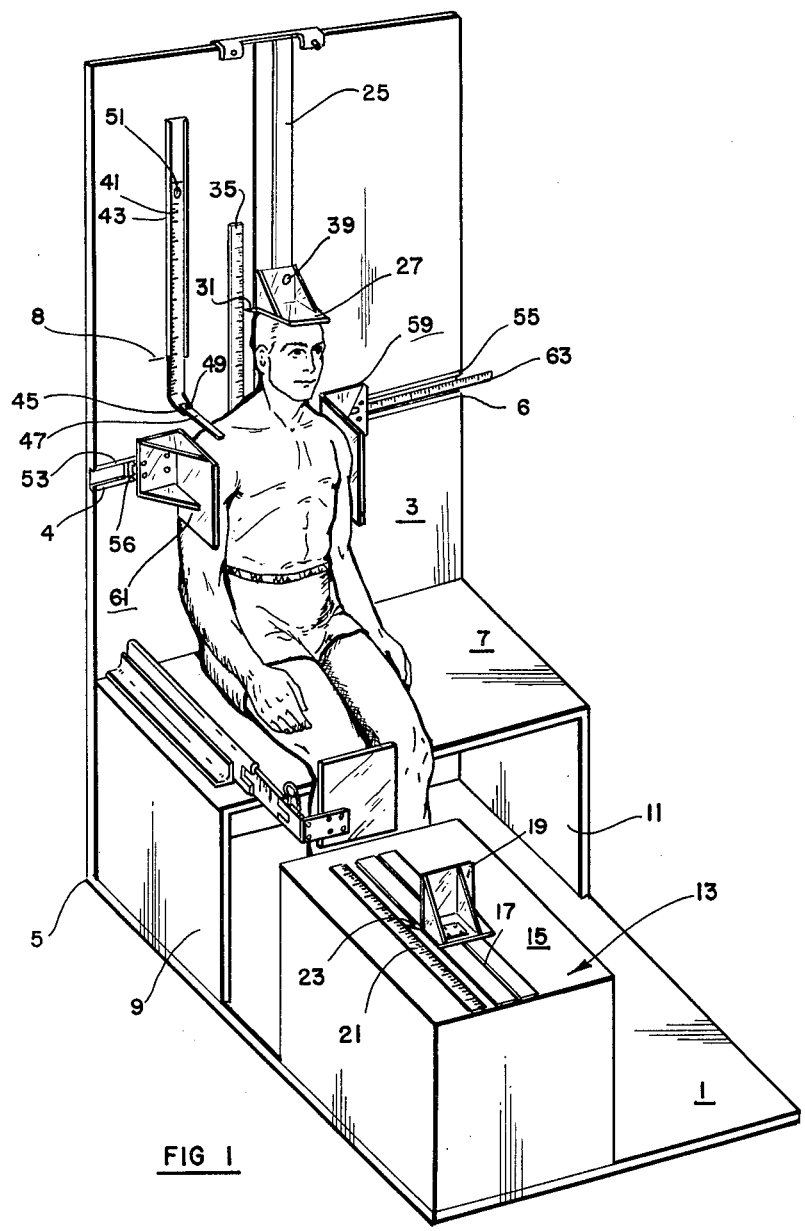
FIG. 1 is a front perspective view of a measuring device embodying the features of our invention.

Referring to FIG. 1 in the drawing, we provide a supporting L-shaped frame comprising in the structure illustrated a base member 1 and a back member 3, said back member being joined to the base member at one end 5 and being extended upwardly in a plane perpendicular to the base member a predetermined distance therefrom. A seat 7 is joined to the back member 3 and is supported on the base member 1 in any conventional manner such as by legs 9 and 11. A footrest 13 is placed a predetermined distance in front of the seat 7 and is suitably attached to the base member 1 whereby its top surface 15 is the same height above the base 1 as is the seat 7. The surface 15 is slotted at 17 to receive a guide 19 slidably supported therein. The surface 15 has scale indicia 21 thereon reading outwardly from the seat 7 as a reference point, the guide having a pointer 23 thereon coacting with the scale indicia 21 to indicate the buttock-leg length of a subject.

A vertical slot 25 is centered in the upper half of the back member 3. Slidably supported on each side of back member 3 are guides 27 and 29 (FIG. 6) having pointers 31 and 33 respectively. The scale 35 reading upwardly is disposed at the side of the slot to indicate the sitting height of a subject, and the scale 37 reading upwardly (FIG. 6) is disposed on the back of backing member 3 at the side of slot 25 to indicate the standing height of a subject. The guide members 27 and 29 are secured in position by a set screw 39.

To facilitate the determining of the shoulder height of a subject, we provide a measuring scale 41, which is slidably located in a channel 43. The lower end 45 of the scale has an arm 47 pivotally connected thereto by means of a pivot pin 49 or the like. The arm provides convience in manipulation of the scale to make contact with the shoulder of the subject. The scale 41 is positioned inside of the channel 43 so that the thirty-five reading on the scale is exactly thirty-five inches from the seat 7. The marking 8 on member 3 designates this point. The scale indicia on this member 41 reads upwardly in decreasing order whereby a reading of the shoulder height of a subject can be read directly from the scale. The thumbscrew 51 disposed through the upper end of the scale member 41 secures it in its adjusted positions.

To facilitate the determining of the measurement of the shoulder breadth (FIG. 2), an elongated channel member 53 is positioned in member 3 approximately shoulder height above the seat 7 and extending from the edge 4 inwardly a distance approximately one-third the width of the back 3. A second channel member 55 is likewise extended from the edge 6 of the back 3. A slide 57 made of Teflon or any conventional anti-friction material is positioned inside of channel 55 and a similar slide 56 is positioned inside of channel 53. To the Teflon slide 57 is fastened with screws 58 or the like an L-shaped guide assembly 59. In like manner an L-shaped guide assembly 61 is fastened to the Teflon slide 56 positioned in channel 53. A rod 63 having scale indicia 64 thereon is connected to guide 61. Rod 63 extends along a groove 65 connecting channel member 53 with channel 55. Guide 59 has a cut out portion 67 provided with a pointer 69 which is operatively associated with the scale indicia 64 on rod 63 so that the adjusted position of the guide 59 is indicated relative to the position of guide 61. Since each of the guides gently touches the deltoid muscles of the upper arms of a subject, the distance between them will provide a measurement of the subjects's shoulder breadth.

Figure 4:
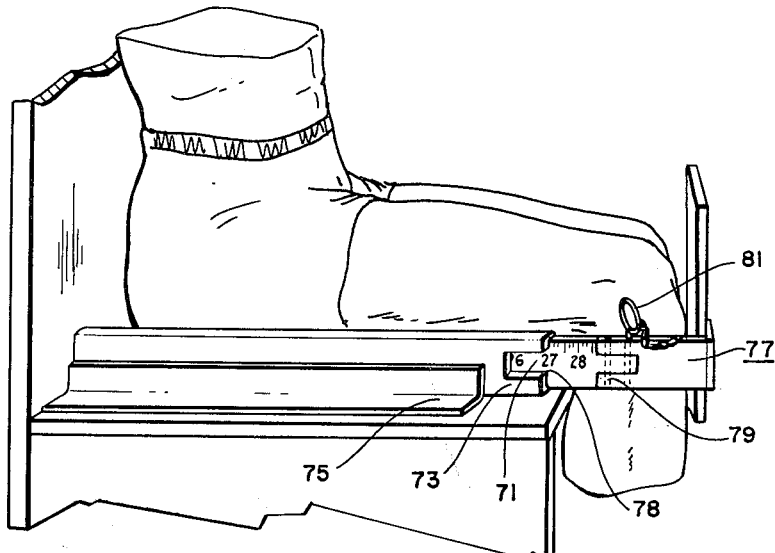
FIG. 4 is a fragmentary side elevational view in partial vertical section to illustrate structural details of the buttock-knee length measuring means.

To facilitate the determining of the buttock-knee length (FIG. 4), a measuring scale 71 is slidably disposed in a channel 73 fastened to one side of seat 7 by a bracket 75. A guide 77 is pivotally connected to the measuring scale through pin 79. The guide 77 which abuts the knee cap of a subject is able to be swung outwardly on pin 79 to enable the subject to stretch his leg onto the footrest 13 for the buttock-leg length measurement. The ring pin 81 locks the guide 77 into position for making the buttock-knee length measurement. The edge 78 of channel 73 provides the reference point for making the measurement.

Figure 5:
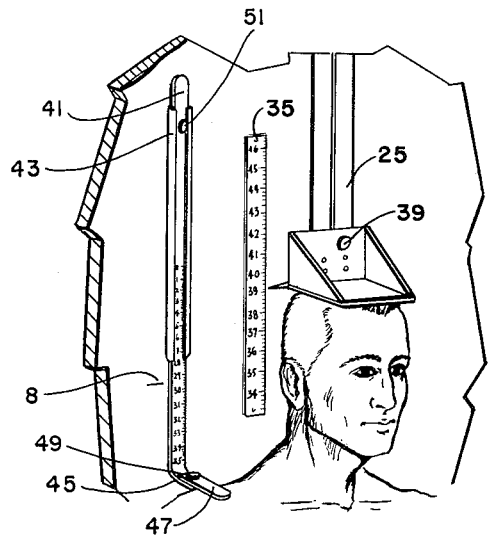
FIG. 5 is an enlarged front perspective view of the upper portion of the device to illustrate in more detail the sitting shoulder height and the sitting height measuring means.

In order to better understand the operation of the device, a detailed description of the various measuring operations is hereinafter set forth:

Referring to FIG. 1, the subject sits erect on seat 7 with his head, shoulders, back and buttocks firmly positioned against the back member 3. The subject is centered directly beneath the vertical slot 25 with his feet (not shown) resting on the base member 1 so that his knees are bent approximately at right angles. The experimenter stands directly facing the subject and releases the set screw 39 to enable the guide 27 to move downwardly in slot 25 until its surface makes contact with the highest surface on the subject's head (FIG. 5). The experimenter then notes the number on scale 35 marked by the bottom edge of pointer 31. He records this as the sitting height of the subject.

The experimenter than moves scale 41 downwardly until the arm 47 makes contact with the acromion process in the subject's shoulder. The experimenter locks the scale in position with screw 51, and reads the sitting shoulder height of the subject indicated by the marking 8.

Figure 2:
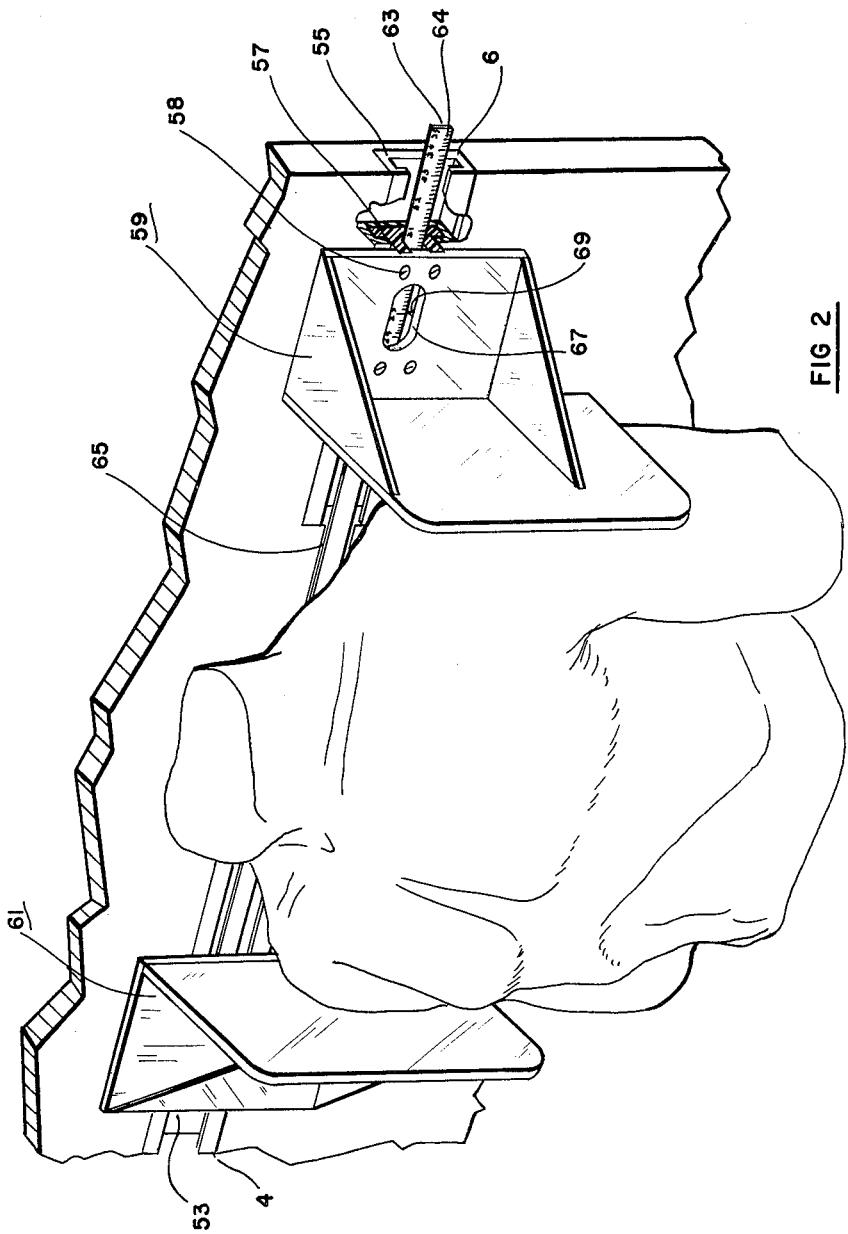
FIG. 2 is a detailed perspective view of the means by which the shoulder breadth measurement is made.

The experimenter now moves the guide assembly 61 inwardly along channel 53 until its surface touches the right deltoid muscle of the subject (FIG. 2). For this measurement, it is important that the subject permit his arms to hang at the side of his body with his hands resting on his knees as shown in FIG. 1. The guide assembly 59 is now moved inwardly along channel member 55 until its surface touches the left deltoid muscle of the subject. The experimenter reads the marking on rod 63 indicated by pointer 69 to obtain the shoulder breadth measurement.

With the subject in the same position, the experimenter (FIG. 4) moves the scale 71 along channel 73 until the guide 77 is firmly positioned against the knee cap of the subject. The experimenter reads the numeral on scale 71 indicated at 78 to determine the buttock-knee length of the subject.

Figure 3:
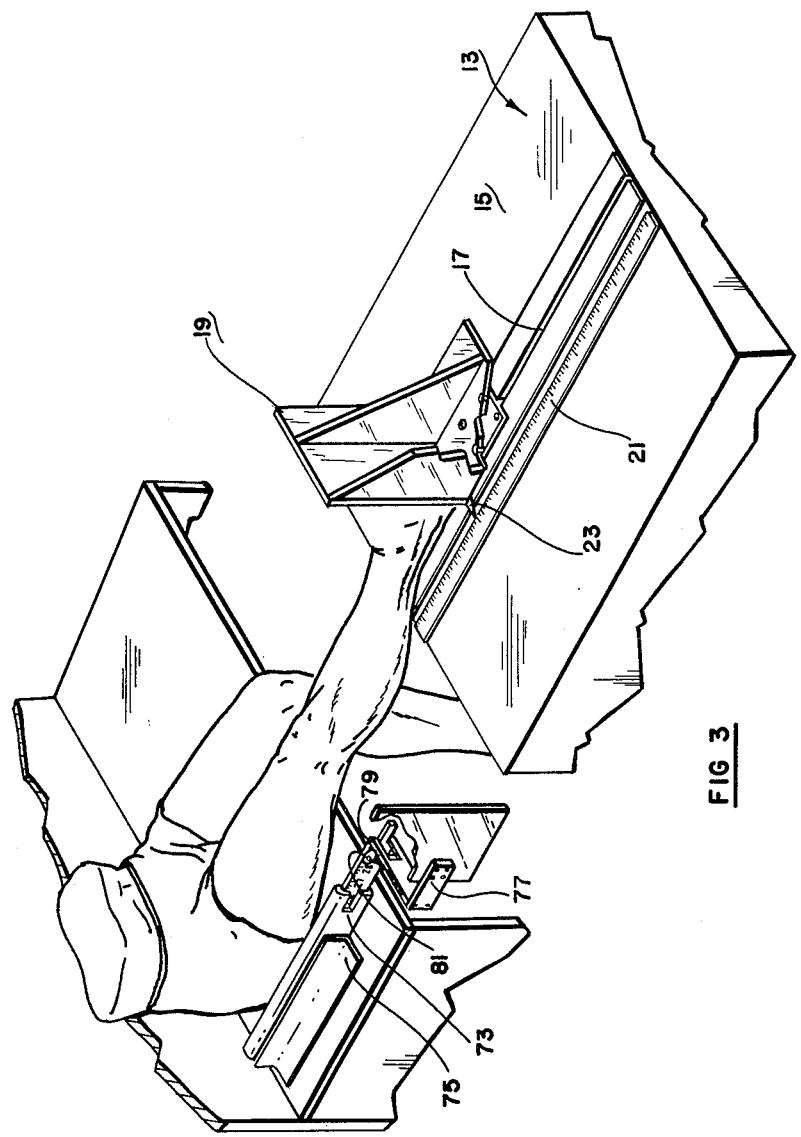
FIG. 3 is an enlarged front perspective view of the lower portion of the device with parts broken away to illustrate in more detail the buttock-leg length measuring means.

The guide 77 is now pivoted on pin 79 by removing the pin 81 to enable the subject to extend his leg onto the surface 15 (FIG. 3). The guide 19 is moved along slot 17 until it makes contact with the subject's heel. The experimenter then records the number on scale 21 indicated by pointer 23 the buttock-leg length of the subject.

Figure 6:
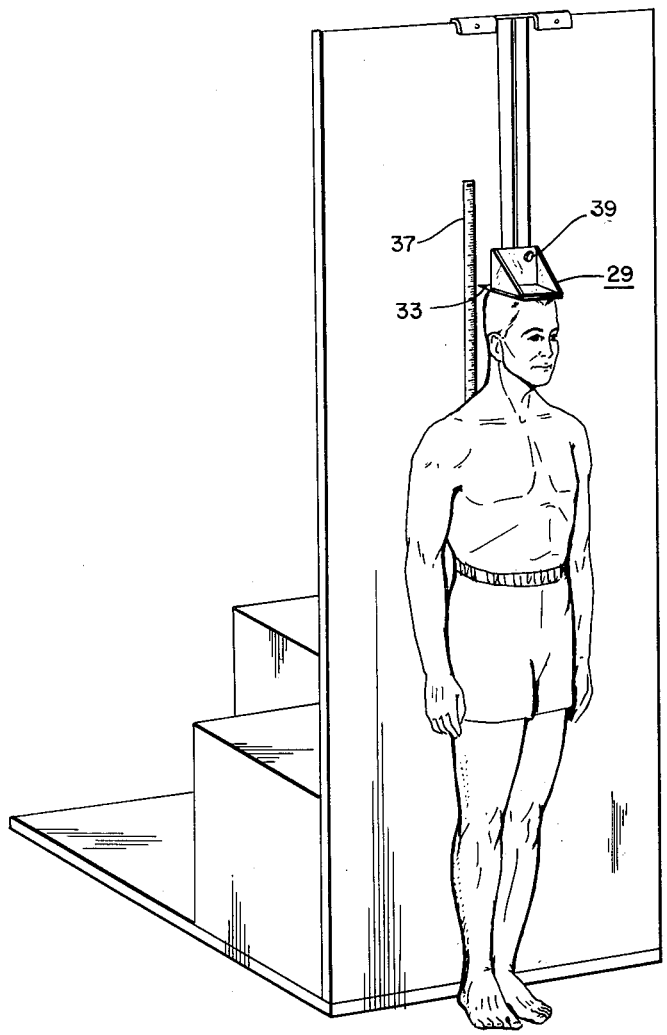
FIG. 6 is an enlarged detail prespective view of the rear of the device to illustrate in more detail the standing height measuring means.

The subject must now stand up and move to the other side of member 3. He stands erect with his back, shoulders and feet firmly positioned against member 3 (FIG. 6). The guide 29 is lowered in slot 25 until it touches the head of the subject, the pointer 33 indicates on scale 37 the standing height of the subject.

In summary, the major advantage of the device is the relative ease with which it can be operated. The various measuring guides are always an integral part of the unit and can be readily moved to mark off the dimensions of the subject, whereby accurate measurements are able to be obtained by an untrained experimenter in using this device without adjustment or prior extensive training in its use.

Obviously many modifications and variations of the present invention are possible in the light of the above teaching. It is therefore to be understood that within the scope of the appended claims the invention may be practiced otherwise than as specifically described herein.

We claim:

1. In a structure of the class described, the combination with a seat
   (a) of a supporting L-shaped frame therefore forming a back member and a base member for the seat, the back member having a vertical groove thereon;
   (b) a footrest having a horizontal groove thereon spaced a predetermined distance from the seat on the base member;
   (c) first measuring means disposed on said back member and slidable in said vertical groove for determining the sitting height of a subject sitting on the seat;
   (d) second measuring means disposed on said back member for determining the shoulder height of a subject sitting on the seat;
   (e) third measuring means disposed on the back member a predetermined vertical distance from the seat for determining the shoulder breadth of a subject sitting on the seat;
   (f) fourth measuring means disposed on the seat for determining the buttock-knee length of a subject sitting on the seat;
   (g) fifth measuring means disposed on said footrest and slidable in said horizontal groove for determining the buttock-leg length of a subject sitting on the seat;
   (h) sixth measuring means disposed on said back member and slidable in said vertical groove for determining the standing height of a subject.

2. In a structure according to claim 1 wherein the first measuring means comprises a measuring scale reading upwardly disposed next to the vertical groove on said back member;
   (a) a guide slidably positioned in the said vertical groove;
   (b) a pointer disposed on said guide and coacting with said scale member.

3. In a structure according to claim 1 wherein the second measuring means comprises a channel vertically disposed on said back member;
   (a) a scale member slidably located in said channel;
   (b) an arm pivotally connected to said scale member for making contact with a shoulder of a subject sitting in said seat;
   (c) and a pointer on said channel coacting with said scale member.

References Cited by the Examiner

UNITED STATES PATENTS 2,053,810  9/36  Bisel _____ 33—174

ISAAC LISANN, *Primary Examiner.*

LEONARD FOREMAN, *Examiner.*